May 18, 1965 F. MULLER ETAL 3,184,748

ERASING ARRANGEMENT FOR RECORDING DEVICES

Filed Feb. 18, 1963

INVENTORS
Felix Müller and
Norbert Helmschrott
by Michael S. Striker
Attorney

United States Patent Office 3,184,748

Patented May 18, 1965

3,184,748

ERASING ARRANGEMENT FOR RECORDING DEVICES

Felix Muller and Norbert Helmschrott, Schwenningen (Neckar), Germany, assignors to Kienzle Apparate G.m.b.H., Villingen, Black Forest, Germany Filed Feb. 18, 1963, Ser. No. 259,037
Claims priority, application Germany, Feb. 22, 1962, K 45,968; Dec. 5, 1962, K 48,388
10 Claims. (Cl. 346—21)

Figure 2:
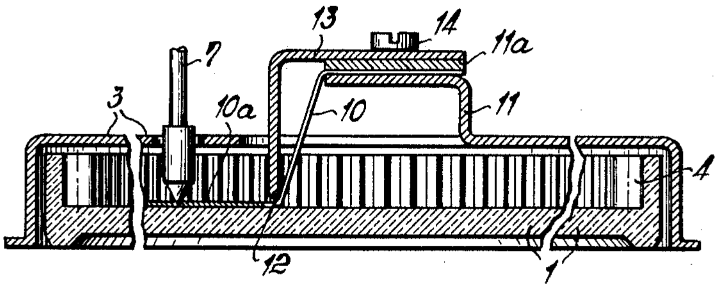

The present invention relates to an erasing arrangement for recording devices, and more particularly to a recording device of the type in which a continuous record is made, and automatically erased so that no permanent record is formed, but the recordings are maintained only for a certain time period.

Recording devices of this type are particularly used for recording speedometers or tachographs, and generally include a rotating record carrier having a layer of a substance in which a recording stylus forms a furrow constituting the record. Before the recorded furrow arrives again in the region of the stylus after a single revolution, it is erased so that the stylus always operates on a surface of the layer from which the recording has been erased.

Erasing means serving this purpose are known, but they all have inherent disadvantages. It has been proposed to erase by means of a roller which applies additional quantities of the substance of the layer to the same. It has also been proposed to scrape off the entire layer where the same carries a record, and to apply the scraped off substance again to the carrier of the layer. Other solutions propose rollers turning in the same, or in opposite direction to the moving record carrier, to fill the recorded furrow, and to apply additional substance to the layer to form a smooth surface.

It is one object of the present invention to overcome the disadvantages of prior art constructions, and to provide an erasing means which is of simple construction, but which produces a smooth surface on the substance so that a recorded furrow or track completely disappears.

Another object of the present invention is to provide an erasing device which will reliably operate even if dust is deposited on the layer.

Another object of the invention is to provide an erasing device in which no additional material is added to, or taken away from the layer in which the recordings are made.

Another object of the present invention is to provide an erasing device in which dust particles caught in the erasing device cannot form tracks in the surface of the substance in which the recordings are made.

With these objects in view, the present invention is advantageously applied to a recording device, such as a recording speedometer. One embodiment of the invention comprises a support, a layer of a deformable and moldable substance located on the support, recording means, such as a stylus, engaging the layer so as to form in the same a distinguishable recorded track, for example a furrow, and a flexible foil in contact with the layer. When the support with the layer of the substance moves relative to the recording stylus and to the flexible foil, the stylus forms a furrow, and the foil erases the furrow by forming a smooth surface on the layer.

In the preferred embodiment of the invention, the flexible foil is secured to a holding means which has a guide edge forming a gap with the layer of the substance. The flexible foil passes through the gap and has an end portion lying flat on the layer of the deformable substance, and sliding on the same. The main function of the erasing portion of the foil is to fill the furrow made by the recording stylus by again placing the portions of the substance which were displaced from the furrow again in the furrow. In order to achieve a better adherence of the substance to the surface of the support thereof, this surface is roughened, for example by sand blasting.

Figure 1:
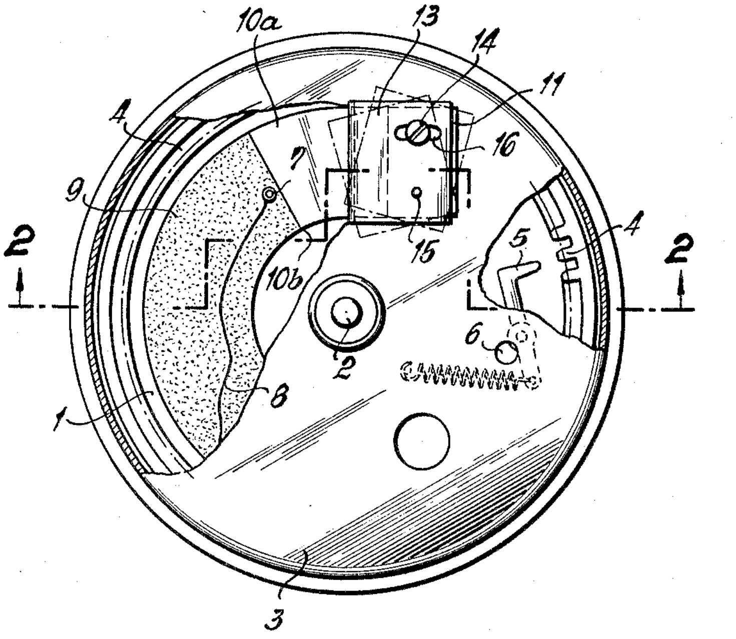

The novel features which are considered as characteristic for the invention are set forth in particular in the appended claims. The invention itself, however, both as to its construction and its method of operation, together with additional objects and advantages thereof, will be best understood from the following description of specific embdiments when read in connection with the accompanying drawings, in which:

FIG. 1 is a front view illustrating a recording speedometer incorporating the present invention; and FIG. 2 is a fragmentary sectional view on an enlarged scale and taken on line 2—2 in FIG. 1.

The construction of the recording speedometer to which the present invention is applied is known, and for example disclosed in the German Patent 1,098,748, and in the co-pending application 74,862, filed December 9, 1960, and now abandoned. Therefore, the details of the recording device, which have no bearing on the present invention, are not illustrated in the drawing for the sake of clarity.

A rotary support 1 is mounted for turning movement on a shaft 2 in a casing 3, and has along its periphery inner teeth 4 cooperating with a locking pawl 5. Locking pawl 5 is spring-loaded, and turnably mounted on the cover portion of casing 3 so that it will engage a recess between two gear teeth 4 when released by the locking pin 6. A recording stylus 7 is movable in radial direction by speed measuring means, and mounted on a stationary part of the casing, and engages a layer 9 on the surface of support 1 so that during rotation of support 1 in counterclockwise direction as viewed in FIG. 1, a track or furrow 8 is formed in the layer 9 which consists of a deformable and moldable substance, such as a thick paint. Support 1 is made of a transparent material, so that the furrow 8 which goes down to the surface of support 1, is easily distinguishable from the unbroken surface of the paint 9. In order to assure a reliable adherence of the paint 9 to the surface of support 1, this surface is slightly roughened, which is best done by sand blasting, since a very uniform and fine roughened surface is necessary to maintain the transparency of support 1. Also, if the surface is too rough, it is not possible for the recording stylus to completely remove the paint in the furrow so that the same would not be as clearly distinguishable, as desired. However, if the surface of support 1 is roughened to a selected degree, complete adherence of the moldable and deformable paint 9 to support 1 can be achieved, without impairing the necessary contrast between the recorded furrow 8 and the unbroken surface of the paint 9.

It is evident that after one complete revolution of support 3 with layer 9, a portion of layer 9 carrying a recording would again be engaged by the stylus, and therefore erasing means are provided for erasing the recorded track before the layer 9 is engaged by stylus 7.

The casing 3 has a projecting portion 11, as best seen in FIG. 2. The end of a flexible foil 10 lies on projecting portion 11 and is clamped to the same by a plate 11*a*. A pivot pin 15 is secured to portion 11, and turnably supports a holding member 13 which is provided with a part circular slot 16 through which a screw 14 passes into a threaded portion of member 11. Consequently, holding member 13 can be turned between a plurality of positions, as indicated in chain lines in FIG. 1, and secured by screw 14 in any one of the adjusted positions.

Holding member 13 has a downwardly extending portion terminating in a guide edge 12 which extends parallel to the layer 9 and forms a gap with the same. Foil 10 extends downwardly from its clamped end portion and through the gap so that the end portion 10*a* of the foil lies flat on layer 9. As clearly shown in FIG. 2, the foil is bent over the guide edge 12, and as best seen in FIG. 1, portion 10a has a shape corresponding to the shape of a sector of the ring-shaped layer 9, while the edge 10b of the foil end portion 10a extends in radial direction with respect to the axis of rotation of support 1 and of ring-shaped layer 9. Holding member 13 may also be adjusted until its guide edge 12 extends in radial direction.

The foil end portion 10a extends from guide edge 12 almost to the stylus 7, and covers a corresponding area of layer 9 so that foil end portion 10a slides on layer 9 during rotation of support 1, and forms a smooth surface on the same, completely erasing and filling in the furrow 8. It will be understood that any time during operation of the device, a recording 8 will extend between recording stylus 7 and guide edge 12 of holding member 13 so that the speed of a vehicle during a predetermined time period is recorded at all times. After this time period, which corresponds to almost a complete revolution of the support 1, the recording is erased.

The erasing function of foil portion 10a is accomplished by pushing the parts of the substance which were displaced from the furrow and accumulated on the sides of the furrow, back into the furrow. In the event that impurities, such as dust, lint or similar particles drop onto the layer and are retained by the same, such particles will not form any tracks on the recording layer. If the particles are small, they will pass through the gap between the foil in the region of guide edge 12, and the layer, and will be simply smoothed down by the free foil portion 10a. This is possible due to the fact that foil portion 10a is not rigid, and permits the passage of small particles which only slightly project from the surface of the layer 9. In construction according to the prior art where a rigid edge was provided for a similar purpose, particles were retained by the edge, and formed circular grooves in the layer. When particles large enough to be retained by the guide edge 12 are deposited on layer 9, such particles will also begin to form circular tracks, but before the same reach recording stylus 7, these very fine tracks are completely eliminated by the portion 10a of the flexible foil. Consequently, the surface of the substance 9 reaching the recording stylus is completely smooth.

If the device is used as a recording speedometer, support 1 with the layer of the deformable and moldable substance 9 is driven at a speed proportional with the distance covered by the conveyance, while the recording stylus is operated in radial direction with respect to the axis of rotation of support 1 to indicate by its radial displacement the speed of the vehicle. In this manner, the track 8 is continuously formed, and continuously erased by the foil portion 10a so that a recording of almost 360° is maintained at all times.

It will be understood that each of the elements described above, or two or more together, may also find a useful application in other types of recording devices differing from the types described above.

While the invention has been illustrated and described as embodied in an erasing arrangement for a recording speedometer, it is not intended to be limited to the details shown, since various modifications and structural changes may be made without departing in any way from the spirit of the present invention.

What is claimed as new and desired to be secured by Letters Patent is:

1. In a recording device, in combination, a support; a layer of a deformable and moldable substance located on said support; recording means engaging said layer so that upon relative movement between said support and said recording means, said recording means deforms said layer to form a distinguishable recorded track; and erasing means including a flexible foil lying substantially flat on said layer over an area covering a portion of said recorded track for forming a smooth surface on said layer during relative movement between said support on one hand, and said recording means and said erasing means on the other hand whereby said track is erased.

2. In a recording device, in combination, a support; a layer of a deformable and moldable substance located on said support; recording means engaging said layer so that upon relative movement between said support and said recording means, said recording means deforms said layer to form a distinguishable recorded track; and erasing means including a holding member having a guide edge extending parallel to the surface of said layer and transversely to the directionof relative movement between said recording means and said support, said guide edge forming a gap with the surface of said layer, and a flexible foil passing through said gap and having a portion lying flat on said layer for forming a smooth surface on said layer during relative movement between said support on one hand, and said recording means and said erasing means on the other hand whereby said track is erased.

3. In a recording device, in combination, a movable support; a layer of a deformable and moldable substance located on said support; recording means engaging said layer so that upon relative movement between said support and said recording means, said recording means deforms said layer to form a distinguishable recorded track; and stationary erasing means including a holding member having a guide edge extending parallel to the surface of said layer and transversely to the direction of relative movement between said recording means and said support, said guide edge forming a gap with the surface of said layer, means for adjusting said holding member and the position of said guide edge to vary the angle between said guide edge and the direction of relative movement between said guide edge and said support, and a flexible foil passing through said gap and having a portion lying flat on said layer for forming a smooth surface on said layer, whereby said track is erased.

4. In a recording device, in combination, a turnable support; a circular layer of a deformable and moldable substance located on said support and turning with the same; a stationary recording means including a recording stylus movable in radial direction of said layer and support and engaging said layer so that during turning movement of said support and layer, said recording stylus forms a furrow in said layer constituting record; a stationary holding member including a wall transverse to said surface and having a guide edge extending parallel to the surface of said layer transversely to the direction of movement of said support and layer, said guide edge forming a gap with the surface of said layer and being located forwardly of said stylus in the direction of movement of said support and layer; and a flexible foil secured to said holding member and passing through said gap bent about said guide edge, and having a portion in contact with said layer in the region between said stylus and said guide edge for forming a smooth surface on said layer whereby said furrow is erased so that a layer portion having a smooth surface moves toward said stylus.

5. In a recording device, in combination, a turnable support; a circular layer of a deformable and moldable substance located on said support and turning with the same; a stationary recording means including a recording stylus movable in radial direction of said layer and support and engaging said layer so that during turning movement of said support and layer, said recording stylus forms a furrow in said layer constituting record; a stationary holding member including a wall transverse to said surface and having a guide edge extending parallel to the surface of said layer transversely to the direction of movement of said support and layer, said guide edge forming a gap with the surface of said layer and being located forwardly of said stylus in the direction of movement of said support and layer; adjusting means for adjusting the position of said holding member and including a pivot member supporting said holding member for turning movement about an axis perpendicular to said layer whereby the angle between a radius of said layer and said guide edge can be varied; and a flexible foil secured to said holding member and passing through said gap bent about said guide edge, and having a portion lying substantially flat on said layer in the region between said stylus and said guide edge for forming a smooth surface on said layer whereby said furrow is erased so that a layer portion having a smooth surface moves toward said stylus.

6. In a recording device, in combination, a turnable support; a circular layer of a deformable and moldable substance located on said support and turning with the same; a stationary recording means including a recording stylus movable in radial direction of said layer and support and engaging said layer so that during turning movement of said support and layer, said recording stylus forms a furrow in said layer constituting record; a stationary holding member having a first portion spaced from said layer and extending substantially parallel to the same, and a second portion extending from said first portion toward said layer and having a guide edge extending parallel to the surface of said layer transversely to the direction of movement of said support and layer, said guide edge forming a gap with the surface of said layer and being located forwardly of said stylus in the direction of movement of said support and layer; and a flexible foil secured to said first portion of said holding member and having a portion freely extending to said guide edge, and a free end portion passing through said gap and lying flat on said layer so that said flexible foil is bent about said guide edge, said end portion covering an area of said layer between said guide edge and said stylus for forming a smooth surface on said layer whereby said furrow is erased so that a layer portion having a smooth surface moves toward said stylus.

7. In a recording device, in combination, a turnable support; a ring-shaped circular layer of a deformable and moldable substance located on said support and turning with the same; a stationary recording means including a recording stylus movable in radial direction of said layer and support and engaging said layer so that during turning movement of said support and layer, said recording stylus forms a furrow in said layer constituting record; a stationary holding member having a first portion spaced from said layer and extending substantially parallel to the same, and a second portion extending from said first portion toward said layer and having a guide edge extending parallel to the surface of said layer transversely to the direction of movement of said support and layer, said guide edge forming a gap with the surface of said layer and being located forwardly of said stylus in the direction of movement of said support and layer; adjusting means for adjusting the position of said holding member and including a pivot member supporting said holding member for turning movement about an axis perpendicular to said layer whereby the angle between a radius of said layer and said guide edge can be varied; and a flexible foil secured to said first portion of said holding member and having a portion freely extending to said guide edge, and a free end portion passing through said gap and lying flat on said layer so that said flexible foil is bent about said guide edge, said end portion being shaped as a part-circular ring section corresponding to the shape of a section of said ring-shaped layer and covering an area of said layer between said guide edge and said stylus for forming a smooth surface on said layer whereby said furrow is erased so that a layer portion having a smooth surface moves toward said stylus.

8. A device as set form in claim 7 and including a stationary support supporting said pivot member of said adjusting means, wherein said holding member has a part-circular slot; and wherein said adjusting means include a screw threaded into said stationary support and passing through said slot so that said holding member can be secured in a plurality of turned adjusted positions.

9. In a recording device, in combination, a transparent support having a roughened surface; a layer of a deformable and moldable substance located on said surface of said support; recording means engaging said layer so that upon relative movement between said support and said recording means, said recording means deforms said layer to form a distinguishable recorded track exposing said surface; and stationary erasing means including a flexible foil lying substantially flat on said layer over an area covering a portion of said recorded track for forming a smooth surface on said layer during relative movement between said support on one hand, and said recording means and said erasing means on the other hand whereby said track is erased.

10. In a recording device, in combination, a turnable support having a roughened surface adapted to be made by sand-blasting; a circular layer of a deformable and moldable substance located on said surface of said support and turning with the same; a stationary recording means including a recording stylus movable in radial direction of said layer and support and engaging said layer so that during turning movement of said support and layer, said recording stylus forms a furrow in said layer exposing said surface; a stationary holding member having a guide edge extending parallel to the surface of said layer transversely to the direction of movement of said support and layer, said guide edge forming a gap with the surface of said layer and being located forwardly of said stylus in the direction of movement of said support and layer; and a flexible foil secured to said holding member and passing through said gap bent about said guide edge, and having a portion in contact with said layer in the region between said stylus and said guide edge for forming a smooth surface on said layer whereby said furrow is erased so that a layer portion having a smooth surface moves toward said stylus.

References Cited by the Examiner

UNITED STATES PATENTS

| | | | |
|---|---|---|---|
| 1,681,460 | 8/28 | Bruhn | 346—21 |
| 1,697,166 | 1/29 | Davis. | |
| 3,011,854 | 12/61 | Allen | 346—21 |
| 3,013,854 | 12/61 | Vogtlin et al. | 346—18 |
| 3,022,130 | 2/62 | Casiglia | 346—21 |

LEO SMILOW, *Primary Examiner.*